United States Patent [19]

Miller

[11] Patent Number: 4,710,309

[45] Date of Patent: Dec. 1, 1987

[54] LIGHTWEIGHT SOUNDPROOFING, INSULATION AND FIREPROOFING MATERIAL AND METHOD

[75] Inventor: Dennis C. Miller, Lowell, Ind.

[73] Assignee: American Sprayed-On Fibers, Inc., Merrillville, Ind.

[21] Appl. No.: 937,929

[22] Filed: Dec. 4, 1986

[51] Int. Cl.$^4$ .............................................. E04B 1/88
[52] U.S. Cl. .................................. 252/62; 106/18.12; 162/159; 252/607
[58] Field of Search ................ 252/62, 607; 162/159; 106/18.12

[56] References Cited

U.S. PATENT DOCUMENTS

| | | | |
|---|---|---|---|
| 1,568,415 | 1/1926 | Pilliod | 252/62 |
| 1,944,008 | 1/1934 | Hobart | 25/156 |
| 2,470,641 | 5/1949 | Portz | 252/62 |
| 2,756,159 | 7/1956 | Kendall et al. | 252/62 |
| 3,015,626 | 1/1962 | Kingsbury | 252/62 |
| 3,623,938 | 11/1971 | Jenkins | 161/159 |
| 3,904,539 | 9/1975 | Ruff | 252/62 |
| 3,952,830 | 4/1976 | Oshida et al. | 181/33 G |
| 3,983,040 | 9/1976 | Draganov | 252/8.1 |
| 4,012,262 | 3/1977 | Patterson et al. | 252/62 |
| 4,172,804 | 10/1979 | Christianson et al. | 252/62 |
| 4,203,773 | 5/1980 | Temple et al. | 106/75 |
| 4,244,781 | 1/1981 | Heckman | 252/62 |
| 4,373,005 | 2/1983 | Goodwin | 428/357 |
| 4,419,256 | 12/1983 | Loomis | 252/62 |
| 4,472,478 | 9/1984 | Briggs et al. | 162/181.4 |

Primary Examiner—Robert A. Wax
Attorney, Agent, or Firm—Wood, Dalton, Phillips, Mason & Rowe

[57] ABSTRACT

A lightweight soundproofing, insulation and fireproofing material and method is disclosed. A dry composition is provided which includes 60–80% by weight of an inorganic lightweight nonflammable fibrous material, 16.67–36.67% by weight of an organic lightweight normally-flammable fibrous material, and 3.33–10% by weight of a refracted clay material. The non-flammable fibrous material is pulled apart to provide a high temperature loose fiber material, the normally-flammable fibrous material is shredded, and the refracted clay material is embedded in the normally-flammable fibrous material after shredding to reduce the flammability thereof. Thereafter, the nonflammable fibrous material is mixed with the normally-flammable fibrous material to complete the dry composition. A liquid adhesive is provided which includes liquid sodium silicate having a ratio of silicon dioxide to sodium oxide that is greater than 3.22:1, the liquid sodium silicate in the form of a solution of about 50% water is mixed with water in a ratio of approximately 1:1, and a surfactant can be added to the liquid sodium silicate to act as a wetting agent for application and flexibility purposes. With these constituent components, the liquid adhesive is used with the dry composition at the rate of approximately 55 gallons of liquid adhesive for each 300 lbs. of dry composition.

39 Claims, No Drawings

LIGHTWEIGHT SOUNDPROOFING, INSULATION AND FIREPROOFING MATERIAL AND METHOD

FIELD OF THE INVENTION

The present invention relates to building materials and methods and, more particularly, to a lightweight soundproofing, insulation and fireproofing material and method.

BACKGROUND OF THE INVENTION

For many years, it has been recognized that there is a need for a lightweight building material capable of soundproofing, insulation and fireproofing. This need has become severe due to the health hazards associated with asbestos which was for many years the principal source of fireproofing in buildings and which presently is being removed and replaced on an enormous scale in buildings located virtually throughout the world. In fact, some sources estimate that more than 170 million tons of asbestos have been used over the years with much of it still being in place.

In order to grasp the scope of the problem, asbestos was commonly mixed with paper and wool. The ratios were such that installations typically utilized 3% asbestos to 97% paper and wool. Clearly, there is an enormous need for a material that can replace asbestos.

However, an asbestos replacement must be a lightweight material for practical reasons. Since asbestos fireproofing is very lightweight, it is simply not feasible in many instances to utilize present cementicious fireproofing materials such as the product sold under the trademark "Monokote" by W. R. Grace & Co. or a similar material sold by U.S. Mineral Company, both of which are very heavy and do not contain sound proofing qualities. Without question, many buildings which require re-fireproofing were not designed for the weight of cementicious fireproofing materials.

By way of example, a one inch thick coating of "Monokote" applied to 100 square feet weighs on the order of 125 lbs. This is in contrast to asbestos fireproofing which only weighs on the order of one-fourth that amount. For construction based on asbestos fireproofing, the additional weight of cementicious fireproofing cannot be safely supported.

Moreover, while weight is a factor in asbestos replacement, cementicious fireproofing also has other serious drawbacks. This is true, for instance, in new construction where multiple coats of cementicious fireproofing must be applied in order to achieve desired thicknesses thereby escalating labor costs in its application and the very significant weight of cementicious fireproofing requires the use of heavier structural columns and beams due to the additional weight of this material. As a result, the cost of construction is escalated by reason of the necessity of oversized structural support.

While many different types of building insulation have been used, it is recognized as desirable to apply insulation directly to the wall, roof or other surface in buildings with open construction. It is for this reason that spray-on insulation and fireproofing such as those developed and utilized by W. R. Grace & Co., U.S. Mineral Company and others, which have an insulating component and an adhesive, have been used by applying monolithic coatings. Unfortunately, despite the fact that spray-on insulation and fireproofing has been used in the past, inexpensive products which can be applied easily and provide fireproofing have not been available.

Cellulose fiber has been used in spray-on insulation and fireproofing, and boric acid has been added to the cellulose fiber to increase the fire resistance thereof. The boric acid is, however, corrosive to metal and therefore disadvantageous when used in an insulation and fireproofing for metal buildings and, to eliminate the corrosive effect of the boric acid, other chemical agents must be used to buffer the acid. However, such chemical agents are expensive which significantly increases the cost while contributing nothing to the soundproofing and insulating qualities of the product.

As previously mentioned, the products of the type sold by W. R. Grace & Co. and U.S. Mineral Company have been relatively heavy. This adds substantial weight to the surface to be fireproofed. Since the composition is wet when first applied, and only thin layers can be applied due to the weight, usually not more than about one inch can be applied in a single application. This may typically result in a need for four coats to be applied in order to achieve a four inch coating of fireproofing. As will be appreciated, ample time must be allowed for drying between each coat before a subsequent coat can be applied.

Due to the multiple coats that are required, the cost of applying the material and the time required for applying the material are increased. It will also be appreciated that the application equipment must be set up for the separate applications and the operator's time is increased while applying the multiple coats that are required. Moreover, many materials such as cementicious fireproofing will often crack as a result of expansion and contraction of the surface to which it is applied.

While providing fireproofing, it would also be desirable to provide insulation and soundproofing as well, but cementicious fireproofing material does not possess these latter characteristics. In fact, the American Institute of Architecture has recently recognized that a single product that could both soundproof and fireproof would revolutionize the fireproofing industry.

Among the efforts to overcome the problems enumerated in detail hereinabove, Loomis U.S. Pat. No. 4,419,256 proposes a composition for insulation which may be used for reducing thermal transmission, for absorbing sound waves and for providing a fire spread barrier. Unfortunately, the composition includes the use of boric acid and is apparently capable of achieving only a one hour fire rating on a steel column based upon testing at Underwriters Laboratories. Despite the apparent lightweight nature of the composition, it has remained to provide a lightweight soundproofing, insulation and fireproofing material having all of the characteristics enumerated hereinabove.

SUMMARY OF THE INVENTION

Accordingly, the present invention is directed to a lightweight soundproofing, insulation and fireproofing material. The material comprises a dry composition having 60-80% by weight of an inorganic lightweight nonflammable fibrous material, 16.67-36.67% by weight of an organic lightweight normally-flammable fibrous material, and 3.33-10% by weight of a refracted clay material which reduces the flammability of the normally-flammable fibrous material. The material also comprises a liquid adhesive including liquid sodium silicate with a ratio of silicon dioxide, commonly known as silica sand, to sodium oxide, commonly known as soda ash, that is greater than 3.22:1, the liquid adhesive being used with the dry composition at the rate of approximately 55 gallons of liquid adhesive for each 300 lbs. of dry composition. With these constituent components, the liquid adhesive is adapted to retain the dry composition on a surface in a fireproof manner.

In the exemplary embodiment, the nonflammable fibrous material includes mineral wool and the normally-flammable fibrous material includes cellulose fiber. Shredded paper is preferably utilized to provide the cellulose fiber. Advantageously, the mineral wool and shredded paper comprise 90-96.67% by weight of the dry composition.

Preferably, the refracted clay material has been fired at or above a temperature of approximately 3300° F. so as to have a melting point of 2750° F. The refracted clay material is in the form of particles and has a bulk density of 30 lbs. per cubic foot plus or minus 5%. Moreover, the particles of the refracted clay material are embedded in the normally-flammable fibrous material to reduce the flammability thereof.

In the preferred embodiment, a surfactant can be added to the liquid sodium silicate to act as a wetting agent. Preferably, the surfactant is an anionic sulfonated alkyl ester comprising approximately 0.5% by weight of the liquid adhesive.

The present invention is also directed to a method of making a lightweight soundproofing, insulating and fireproofing material. The method includes the steps of providing a dry composition by providing 16.67-36.67% by weight of an organic lightweight normally-flammable fibrous material, shredding the normally-flammable fibrous material, providing 3.33-10% by weight of a refracted clay material and embedding the refracted clay material in the normally-flammable fibrous material after shredding to reduce the flammability thereof. The method of providing the dry composition also includes the steps of providing 60-80% by weight of an inorganic lightweight non-flammable fibrous material, pulling the non-flammable fibrous material apart to provide a high temperature loose fiber material, and mixing the non-flammable fibrous material with the normally-flammable fibrous material after the refracted clay has been embedded in the normally-flammable fibrous material and the non-flammable fibrous material has been pulled apart. The method also includes the steps of providing a liquid adhesive by providing liquid sodium silicate having a ratio of silicon dioxide to sodium oxide that is greater than 3.22:1, mixing the liquid sodium silicate with water in a ratio of approximately 1:1, and adding a surfactant in the liquid sodium silicate to act as a wetting agent. With the lightweight soundproofing insulating and fireproofing material so formed, the liquid adhesive is used with the dry composition at the rate of approximately 55 gallons of liquid adhesive for each 300 lbs. of dry composition.

DETAILED DESCRIPTION OF THE PREFERRED EMBODIMENT

In accordance with the present invention, an inexpensive but highly effective lightweight soundproofing, insulating and fireproofing material for building purposes has been provided. The material comprises a dry composition including 60-80% by weight of an inorganic lightweight non-flammable fibrous material, 16.67-36.67% by weight of an organic lightweight normally-flammable fibrous material, and 3.33-10% by weight of a refracted clay material which reduces the flammability of the normally-flammable fibrous material. Additionally, the material comprises a liquid adhesive including a liquid sodium silicate having a ratio of silicon dioxide, commonly known as silica sand, to sodium oxide, commonly known as soda ash, that is greater in the final product than 3.22:1.

More specifically, the non-flammable fibrous material includes mineral wool and the normally-flammable fibrous material includes cellulose fiber. Preferably, shredded paper is utilized to provide the cellulose fiber and, more particularly, the shredded paper suitably is a long fiber SBS polycoated sulfide paper which gives a desired white color to the material after it has been applied to a surface. As a result of experimentation, it has been determined that the mineral wool and the shredded paper should comprise 90-96.67% by weight of the dry product.

With regard to the mineral wool, it comprises a high temperature loose fiber material that is lightweight, non-burnable, non-meltable, and insulation heat protecting. Preferably, the melting point of the mineral wool is greater than 2100° F. As a result, after the shredded paper has been treated with the refracted clay material, the paper and wool provide a high degree of soundproofing, insulation and fireproofing.

In the preferred embodiment, the refracted clay material has been fired at or above a temperature of approximately 3300° F. so as to have a melting point of 2750° F. The refracted clay material is in the form of particles and has a bulk density of 30 lbs. per cubic feet plus or minus 5%. Moreover, the particles of refracted clay material are embedded in the normally-flammable fibrous material in order to reduce the flammability thereof.

As will be appreciated, the liquid sodium silicate comprises a fireproof adhesive adapted to retain the dry composition on a surface in a fireproof manner. The liquid sodium silicate can be a solution of about 50% water which can thereafter be further diluted by mixing with water in a ratio of approximately 1:1 after which it can be used with the dry composition at the rate of approximately 55 gallons of liquid adhesive for each 300 lbs. of dry composition. Additionally, a surfactant which is preferably an anionic sulfonated alkyl ester comprising approximately 0.5% by weight of the liquid adhesive can be added to act as a wetting agent.

By utilizing a surfactant, the material can be applied in a single coat on the order of four inches thick. It will also remain flexible after curing, and it has been found that, with the combination of the dry composition and liquid adhesive, the adhesive, as specifically set forth herein and in marked contrast to present dry adhesives, will not melt even at 2100° F. after the dry composition and liquid adhesive have been sprayed onto a surface. As a result, the material has been demonstrated to possess excellent insulation and fireproofing qualities.

In fact, the material is believed to be capable of passing a two hour fire rating at 1850° F. in accordance with the requirements of Underwriters Laboratories. It is also known that the material exhibits excellent soundproofing qualities and is extremely lightweight and that a one inch thickness covering 100 square feet weighs approximately only 30 lbs. Accordingly, the material is believed to be the first lightweight soundproofing, insulating and fireproofing material having commercial viability.

While not to be construed as a limitation, the refracted clay material of a type such as that sold under the trademark "Kaolite AZ" by Babcock & Wilcox. It should also be noted that the liquid sodium silicate of a type such as that sold by Occidental Chemical Corporation, although any liquid sodium silicate within the parameters set forth herein will suffice. Further, the surfactant can be of a type such as that sold under the trademark "Nopco" by Occidental Chemical Corporation.

By utilizing a high percentage of mineral wool, the material has an exceptional R value, excellent soundproofing qualities, and does not tend to burn away. It should also be noted that the refracted clay material, when embedded in the shredded paper, reduces its flammability to a tolerable level that does not impede the fireproofing characteristics of the material. Further, by using the surfactant, the liquid adhesive sticks better to the fibrous materials and the material is given greater flexibility after it cures.

In accordance with the present invention, a method of making a lightweight soundproofing, insulating and fireproofing material is disclosed. The method includes the steps of providing a dry composition by providing 16.67–37.67% by weight of an organic lightweight normally-flammable fibrous material, shredding the normally-flammable fibrous material, providing 3.33–10% by weight of a refracted clay material, and embedding the refracted clay material in the normally-flammable fibrous material after shredding to reduce the flammability thereof. The method of providing the dry composition also includes the steps of providing 60–80% by weight of an inorganic lightweight nonflammable fibrous material, pulling the nonflammable fibrous material apart to provide a high temperature loose fiber material, and mixing the nonflammable fibrous material with the normally-flammable fibrous material after the refracted clay material has been embedded in the normally-flammable fibrous material and the nonflammable fibrous material has been pulled apart. The method also includes the steps of providing a liquid adhesive by providing liquid sodium silicate in a solution of about 50% water and having a ratio of silicon dioxide, commonly known as silica sand, to sodium oxide, commonly known as soda ash, that is greater in the end product than 3.22:1, mixing the liquid sodium silicate with water in a ratio of approximately 1:1, after which the liquid adhesive can be used with the dry composition at the rate of approximately 55 gallons of liquid adhesive for each 300 lbs. of dry composition. By forming the material with this method, the liquid adhesive is adapted to retain the dry composition on a surface in a fireproof manner.

In addition, the method may include the step of adding a surfactant to the liquid sodium silicate to act as a wetting agent. Preferably, the surfactant is an anionic sulfonated alkyl ester comprising approximately 0.5% by weight of the liquid adhesive. In this manner, the liquid adhesive will stick better to the fibrous materials and the material will retain flexibility after curing.

While in the foregoing there has been set forth a preferred embodiment of the invention, it will be appreciated that the details herein given may be varied by those skilled in the art without departing from the spirit and scope of the appended claims.

I claim:

1. A dry composition for use with a liquid adhesive to form a soundproofing, insulating and fireproofing material, comprising:
    about 60–80% by weight of an inorganic lightweight nonflammable fibrous material;
    about 16.67–36.67% by weight of an organic lightweight normally-flammable fibrous material; and
    about 3.33–10% by weight of a refracted clay material.

2. The composition as defined by claim 1 wherein said liquid adhesive includes liquid sodium silicate for retaining said dry composition on a surface.

3. The composition as defined by claim 1 wherein said nonflammable fibrous material includes mineral wool and said normally-flammable fibrous material includes cellulose fiber.

4. The composition as defined by claim 3 wherein shredded paper is utilized to provide said cellulose fiber.

5. The composition as defined by claim 4 including about 90–96.67% by weight of said mineral wool and said shredded paper.

6. The composition as defined by claim 1 wherein said nonflammable fibrous material consists of a high temperature loose fiber material.

7. The composition as defined by claim 1 wherein said refracted clay material has been fired at or above a temperature of approximately 3300° F. so as to have a melting point of approximately 2750° F.

8. The composition as defined by claim 7 wherein said refracted clay material is in the form of particles and has a bulk density of about 30 lbs. per cubic foot plus or minus 5%.

9. The composition as defined by claim 8 wherein said particles of refracted clay material are embedded in said normally-flammable fibrous material.

10. A lightweight soundproofing, insulation and fireproofing material, comprising:
    a dry composition including:
    about 60–80% by weight of an inorganic lightweight nonflammable fibrous material;
    about 16.67–36.67% by weight of an organic lightweight normally-flammable fibrous material; and
    about 3.33–10% by weight of a refracted clay material;
    said refracted clay material reducing the flammability of said normally-flammable fibrous material; and
    a liquid adhesive including:
    liquid sodium silicate having a ratio of silicon dioxide to sodium oxide that is greater than 3.22:1;
    said liquid adhesive being adapted retain said dry composition on a surface in a fireproof manner.

11. The material as defined by claim 10 wherein said non-flammable fibrous material includes mineral wool and said normally-flammable fibrous material includes cellulose fiber.

12. The material as defined by claim 11 wherein shredded paper is utilized to provide said cellulose fiber.

13. The material as defined by claim 12 including about 90–96.67% by weight of said mineral wool and said shredded paper.

14. The material as defined by claim 10 wherein said refracted clay material has been fired at or above a temperature of approximately 3300° F. so as to have a melting point of approximately 2750° F.

15. The material as defined by claim 14 wherein said refracted clay material is in the form of particles and has a bulk density of about 30 lbs. per cubic foot plus or minus 5%.

16. The material as defined by claim 15 wherein said particles of refracted clay material are embedded in said normally-flammable fibrous material.

17. The material as defined by claim 10 wherein said nonflammable fibrous material consists of a high temperature loose fiber material.

18. The material as defined by claim 10 wherein said liquid sodium silicate is a solution of about 50% water thereafter further mixed with water in a ratio of approximately 1:1.

19. The material as defined by claim 18 wherein said liquid adhesive is used with said dry composition at the rate of approximately 55 gallons of liquid adhesive for each 300 pounds of dry composition.

20. The material as defined by claim 10 including a surfactant in said liquid sodium silicate to act as a wetting agent.

21. The material as defined by claim 20 wherein said surfactant is an anionic sulfonated alkyl ester comprising about 0.5% by weight of said liquid adhesive.

22. A method of making a dry composition for use with a liquid adhesive for forming a soundproofing, insulating and insulation fireproofing material, comprising the steps of:
provcing about 16.67–36.67% by weight of an organic lightweight normally-flammable fibrous material;
shredding said normally-flammable fibrous material;
providing about 3.33–10% by weight of a refracted clay material;
embedding said refracted clay material in said normally-flammable fibrous material after shredding to reduce the flammability thereof;
providing about 60–80% by weight of an inorganic lightweight nonflammable fibrous material;
pulling said nonflammable fibrous material apart to provide a high temperature loose fiber material; and
mixing said nonflammable fibrous material with said normally-flammable fibrous material;
said nonflammable fibrous material being mixed with said normally-flammable fibrous material after said refracted clay material has been embedded in said normally-flammable fibrous material and said non-flammable fibrous material has been pulled apart.

23. The method as defined by claim 22 wherein said nonflammable fibrous material includes mineral wool and said normally-flammable fibrous material includes cellulose fiber.

24. The method as defined by claim 23 wherein shredded paper is utilized to provide said cellulose fiber.

25. The method as defined by claim 24 including about 90–96.67% by weight of said mineral wool and said shredded paper.

26. The method as defined by claim 22 wherein said refracted clay material has been fired at or above a temperature of approximately 3300° F. so as to have a melting point of approximately 2750° F.

27. The method as defined by claim 26 wherein said refracted clay material is in the form of particles and has a bulk density of about 30 lbs. per cubic foot plus or minus 5%.

28. The method as defined by claim 27 wherein said particles of refracted clay are embedded in said normally-flammable fibrous material.

29. A method of making a lightweight soundproofing, insulating and fireproofing material, comprising the steps of:
providing a dry composition by:
providing about 16.67–36.67% by weight of an organic lightweight normally-flammable fibrous material;
shredding said normally-flammable fibrous material;
providing about 3.33–10% by weight of a refracted clay material;
embedding said refracted clay material in said normally-flammable fibrous material after shredding to reduce the flammability thereof;
providing about 60–80% by weight of an inorganic lightweight non-flammable fibrous material;
pulling said non-flammable fibrous material apart to provide a high temperature loose fiber material; and
mixing said non-flammable fibrous material with said normally-flammable fibrous material;
said non-flammable fibrous material being mixed with said normally-flammable fibrous material after said refracted clay material has been embedded in said nonflammable fibrous material and said nonflammable fibrous material has been pulled apart; and
providing a liquid adhesive by:
providing liquid sodium silicate having a ratio of silicon dioxide to sodium oxide that is greater than 3.22:1;
said liquid adhesive being adapted to retain said dry composition on a surface in a fireproof manner.

30. The method as defined by claim 29 wherein said liquid sodium silicate is a solution of about 50% water thereafter further mixed with water in a ratio of approximately 1:1.

31. The method as defined by claim 30 wherein said liquid adhesive is used with said dry composition at the rate of approximately 55 gallons of liquid adhesive for each 300 lbs. of dry composition.

32. The method as defined by claim 29 wherein a surfactant is added to said liquid sodium silicate to act as a wetting agent.

33. The method as defined by claim 32 wherein said surfactant is an anionic sulfonated alkyl ester comprising about 0.5% by weight of said liquid adhesive.

34. The method as defined by claim 29 wherein said nonflammable fibrous material includes mineral wool and said normally-flammable fibrous material includes cellulose fiber.

35. The method as defined by claim 34 wherein shredded paper is utilized to provide said cellulose fiber.

36. The method as defined by claim 35 including about 90–96.67% by weight of mineral wool and said shredded paper.

37. The method as defined by claim 29 wherein said refracted clay material has been fired at or above a temperature of approximately 3300° F. so as to have a melting point of approximately 2750° F.

38. The method as defined by claim 37 wherein said refracted clay material is in the form of particles and has a bulk density of about 30 lbs. per cubic foot plus or minus 5%.

39. The method as defined by claim 38 wherein said particles of refracted clay material are embedded in said normally-flammable fibrous material.

* * * * *